Oct. 6, 1925.                     1,555,871
J. F. O'CONNOR
CAR CONSTRUCTION
Original Filed March 31, 1924
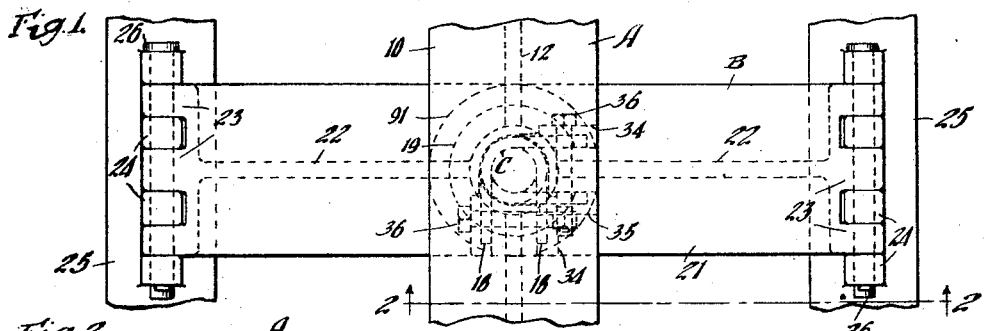
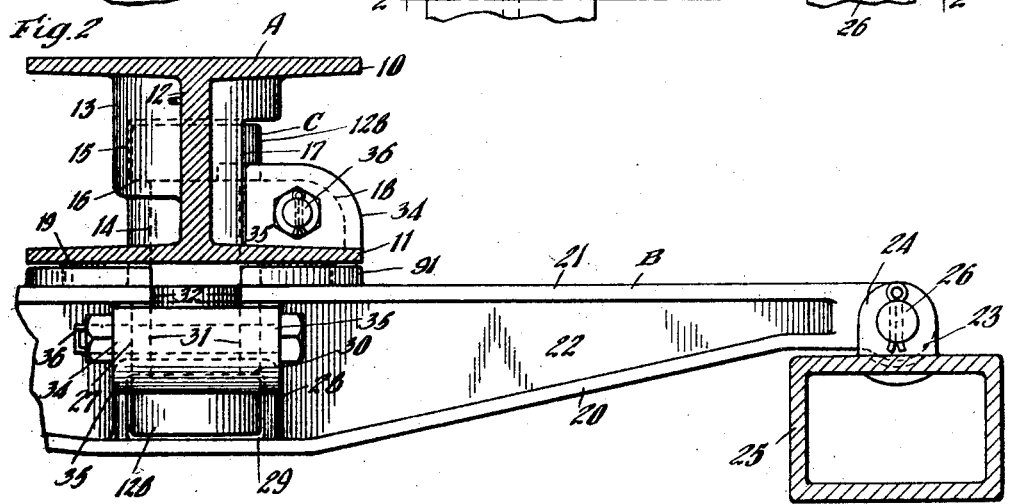
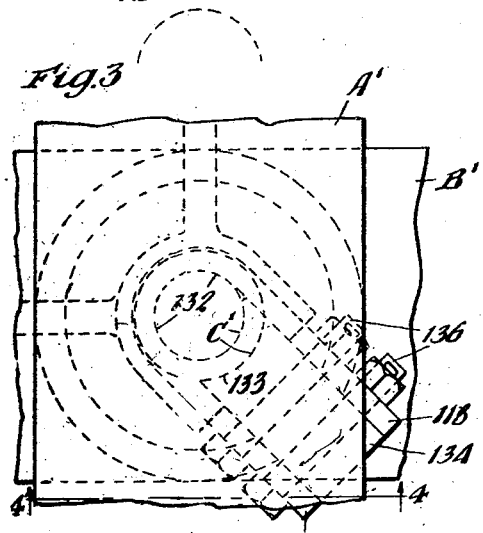
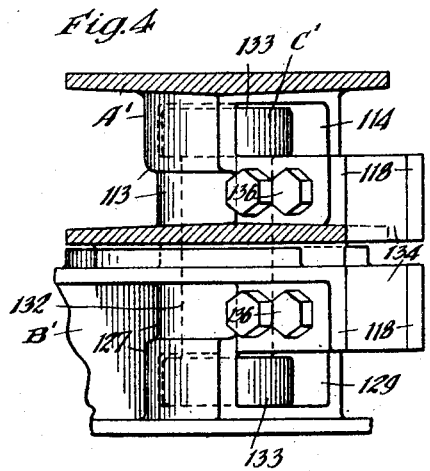
Witness
Wm. Geiger
Inventor
John F. O'Connor
By Geo. J. Haight
His Atty.

Patented Oct. 6, 1925.

1,555,871

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

CAR CONSTRUCTION.

Application filed March 31, 1924, Serial No. 703,058. Renewed March 27, 1925.

*To all whom it may concern:*

Be it known that I, JOHN F. O'CONNOR, a citizen of the United States, residing at Chicago, in the county of Cook and State of Illinois, have invented a certain new and useful Improvement in Car Constructions, of which the following is a full, clear, concise, and exact description, reference being had to the accompanying drawings, forming a part of this specification.

This invention relates to improvements in car construction.

In the operation of railroads, experience has shown the advisability of so connecting the body and truck bolsters of a car that they cannot separate vertically in the event of collision or derailment since this prevents or minimizes the turning over or telescoping of cars.

Heretofore, several expedients have been employed or suggested to overcome the difficulty above indicated, but, so far as we are aware, no one has ever heretofore employed a locking king pin or other structure which would afford a true 100% effective resistance against shear in both horizontal and vertical directions, on account of the practical difficulties which are encountered in applying such a locking device to car construction in service. Furthermore, in certain types of cars, particularly those having six-wheel trucks, such as passenger cars, buffet cars, dining cars and mail cars, it has been found extremely difficult to employ any satisfactory form of locking device because of the inaccessibility to the king pin openings due to the location of the center axle of the truck immediately below the king pin opening and, in some of the cars, inability to obtain access from points above the king pin openings.

One object of my invention is to provide an improved construction wherein provision is made for effectively interlocking the body and truck bolsters against accidental vertical separation while at the same time permitting the necessary turning movements of the truck with respect to the car body, which construction will afford a full 100% value of the inter-locking member against shear in either a horizontal or vertical direction, to thereby insure maximum beneficial results in the event of accident.

A still further object of my invention is to provide a construction having the characteristics set forth in the preceding paragraph and which will be readily adaptable to all types of car construction whether fourwheel or six-wheel trucks are employed and whether or not access may be had from either below or above the king pin opening.

Other objects and advantages of the invention will more clearly appear from the description and claims hereinafter following.

In the drawing forming a part of this specification, Figure 1 is a top plan view of the body and truck bolsters of a railway car showing my improvements in connection therewith. Figure 2 is an elevational view, taken substantially on the line 2—2 of Figure 1. Figure 3 is a fragmentary top plan view of a modified form of construction of the body and truck bolsters connector. And Figure 4 is a vertical sectional view taken substantially on the line 4—4 of Figure 3.

In said drawing, A denotes, broadly, the body bolster of a railway car; B the truck bolster connector and C the king pin or center pin interlocking said bolsters against vertical separation.

Referring to Figures 1 and 2, the body bolster A is formed with top tension flanges 10, bottom compression flanges 11 and a vertically extending web 12 connecting said top and bottom flanges. At the center of the bolster, there is formed a tubular, vertically extending portion 13 provided with a recess 14 extending vertically therethrough, said recess being substantially semicircular in horizontal cross-section and being annularly enlarged at its upper end as at 15 to provide an annular upwardly facing shoulder 16. This recess starts from below the top flanges 10 and is open vertically along one side, as indicated at 17, at right angles to the plane of the web 12. A pair of side arms or lugs 18 extend horizontally and parallel to one another from the bolster at the open side of said recess to form guides, as will be hereinafter described. A center bearing-plate section 19 is provided on the lower face of the bolster concentric with the recess 14.

The truck bolster connector B may be either in the form of a spider or it may be as shown, said member having a bottom tension flange 20, a top compression flange 21 and a vertical web 22 connecting said flanges. The ends of the truck bolster connector are adapted to be detachably connected to bolsters 25 of a six-wheel truck, the ends of the truck bolster connector being provided with spaced, apertured bosses 23 adapted to cooperate with correspondingly spaced, apertured bosses 24 of the bolsters 25. When the apertures through the bosses of both the truck bolster connector and bolsters are in register, they may be secured together in a pivotal or hinged connection by means of pins 26, as shown, thus placing the bolts in multiple shear. At the center of the truck bolster connector there is provided a vertically extending, tubular portion 27 having a vertically extending, substantially semi-circular recess therein, enlarged at the lower end as at 28, and open vertically along one side as at 29. When the bolster and connector are arranged in the position shown in Figures 1 and 2, the side openings 17 and 29 will be at right angles to one another, that is, one will be offset substantially 90° from the other in a horizontal plane. A downwardly facing annular shoulder 30 is formed at the enlarged portion 28 of the recess and a pair of parallel arms or lugs 31 are provided to extend laterally from the open side of the recess, similar to the arms 18 of the body bolster. An annular section 91 is provided on the upper face of the top flange 21 of the truck bolster connector, this section cooperating with the central bearing section 19 of the body bolster to complete the center bearing.

To interlock the truck bolster connector and body bolster against vertical separation, but at the same time to allow them to pivot relatively of one another in a horizontal plane, I preferably employ the following arrangement; a heavy king pin C is used, the same having a main cylindrical body portion 32 of uniform cross section between heads and integral, annual enlargements or heads 128 at its ends, thereby forming a solid, double-headed king pin or center pin. The distance between the heads of the pin is but slightly greater than the distance between the annular shoulders 16 and 30 of the elements when assembled, as shown in Figures 1 and 2. To insert the king pin in place into the position shown in Figures 1 and 2, one of the parts must be swung 90° in a horizontal plane relative to the other. To do this, the pins 26 are withdrawn and the truck bolster connector B is oscillated through the required arc so as to bring the side openings 17 and 29 into vertical registry, after which the solid king pin may be inserted laterally through the vertically alined upper and lower pairs of parallel arms or lugs of the members until the pin is at its innermost position and fits within the vertically alined openings, as shown, the heads of the pins being arranged in the annular enlargements of the openings and engageable against the annular shoulders 16 and 30.

In order to removably secure the locking pin in position, I have arranged the following means: Filler blocks 34 are provided, the width of each filler block being equal to the distance between the opposed arms of each pair of arms 18 and 31, respectively, the inner faces of said filler blocks being made arcuate so as to cooperate with and fit snugly against the body and heads of the king pin, the top and bottom of said blocks, respectively, providing annular shoulders for the king pin, as shown best in Figure 2. Integral arms 35 are provided at the sides of each filler block, said arms being adapted to overlie the corresponding arms of the bolsters, and bolts 36 may be detachably inserted through the alined apertures of the filler blocks and arms so as to removably lock the filler blocks in position, with the bolts in quadruple shear.

In the modification shown in Figures 3 and 4, the body bolster is indicated as A', the truck bolster connector as B' and the locking pin as C'. The design is adapted for use with either four-wheel or six-wheel trucks. At the centers of the members there are formed vertical, tubular portions, the tubular portion of the body bolster being indicated at 113, and the tubular portion of the truck bolster or bolster connector being indicated at 127. The tubular central portions are open at 114 and 129, respectively, these open sides being normally in vertical registry and arranged at an angle of approximately 45° to the longitudinal axis of the car body, so that neither member need be rotated relatively to the other to insert the locking pin into place. Arms 118 are formed on each of the members at said openings and filler blocks 134 are adapted to be inserted between the pairs of arms to form closures for the open sides of the tubular center portions, said filler blocks being removably secured in place by means of bolts 136. The king pin C' in this instance also, is solid throughout, the same having a body portion 132 with integral enlarged heads 133.

From the preceding description considered in connection with the drawing, it will be noted that the interlocking arrangement which I have provided, affords a full 100% resistance to shear in a horizontal direction of the locking pin or bolt C, for any given diameter. Furthermore, the two annular heads of the bolt each affords a full 100% resistance value against shearing in a vertical direction, which I believe to be entirely new with me in car construction, and which is an extremely important factor in the practical operation of railroad cars in the event the cars are subjected to a severe shock or collision. Furthermore, it will be seen that, although I provide for an opening laterally from each of the bolsters in the portions thereof which are subjected to compression, I have so arranged the filler blocks so as to fully compensate for any weakness which might otherwise be present in the compression members of the bolsters. Stated in another manner, each filler block replaces the metal omitted from the compression section of the bolster so that, when said section of the bolster is subjected to compression, the blocks are under compression between the respective arms and flanges of the bolster without diminution of the compression strength of the bolsters. It will also be seen that the blocks, which would necessarily be subjected to some pull from portions of the heads of the bolt which engage them, in the event of a force tending to separate the bolster, are not only securely held by heavy bolts which are in quadruple shear, but the blocks have been so assembled with the arms of the flanges as to utilize the strength of the latter also in resisting vertical movement of the blocks relative to the respective bolsters, all of which factors contribute to an unusually substantial and effective arrangement for the purpose intended.

I claim:

1. In car construction, the combination with a body and a truck bolster having vertically alined tubular portions at their centers, said tubular portions being open through one side thereof, said side openings being out of vertical registry when the bolsters are in normal relation; of a solid king pin insertable laterally into said tubular portions through their side openings when said side openings are in vertical registry.

2. In car construction, the combination with a body and a truck bolster having vertically alined tubular central portions open through one side thereof, said side openings being out of vertical registry when the bolsters are in normal relation; of a double-headed, king pin insertable laterally into said tubular portions through their side openings when said side openings are in vertical registry; and means detachably secured to said bolsters to close said side openings and engage with said pin.

3. In car construction, the combination with a body bolster; of a six-wheel truck bolster adapted to be detachably connected to the truck transoms, said bolsters having vertically alined recesses at their centers, open vertically along one side, the recess in one bolster being horizontally offset from the open side of the recess of the other bolster when the bolsters are in normal position; a king pin insertable laterally into both of said recesses when one of said bolsters is pivotally moved relative to the other to bring said side openings into vertical registry; and removable closure means for said side openings.

4. In car construction, the combination with a body bolster; of a six-wheel truck bolster adapted to be detachably connected to the truck transoms, said bolsters having vertically alined recesses at their centers, said recesses being open along one side and of substantially semi-circular horizontal cross section, the open sides of said recesses being out of vertical registry when the bolsters are in normal position; a king pin insertable through the registered open sides of said recesses, after said truck bolster connector has been swung in a horizontal plane relative to the body bolster; and means detachably secured to said bolsters at said recesses to hold said pin against removal.

5. In car construction, the combination with a body bolster and a truck bolster connector arranged at right angles to one another and having vertically alined recesses at their centers, said recesses being open along one side; of a double headed, king pin insertable into said recesses; and means for removably holding said pin in place.

6. In car construction, the combination with a body bolster and a truck bolster connector arranged at right angles to one another and having vertically alined recesses at their centers, said recesses being open along one side; of a double headed solid king pin insertable into said recesses laterally through the open sides thereof; and means for closing said side openings for removably holding said pin in place.

7. In car construction, the combination with a body bolster and a truck bolster connector arranged at right angles to one another and adapted to pivot relatively of one another, said members having vertically alined recesses at their centers, said recesses being open along one side, said open sides being in vertical registry when the bolsters are in a predetermined pivotal relation; of a double-headed king pin insertable into said recesses laterally through the open sides thereof; and closure means removably secured for closing said side openings and holding said pin in place.

8. In a car construction, the combination with a body bolster and a truck bolster; of a pin for connecting said bolsters, said pin having a head adapted to cooperate with means on the body bolster for preventing removal of the pin in a vertical direction, said bolsters having laterally opening sockets adapted to receive the pin, said sockets being normally out of alinement; and detachable means engaging the pin for preventing lateral displacement of the same, to thereby prevent disengagement of said head and said means on said body bolster.

In witness that I claim the foregoing I have hereunto subscribed my name this 28th day of March, 1924.

JOHN F. O'CONNOR.